United States Patent [19]

Wengrovius et al.

[11] Patent Number: 5,357,007
[45] Date of Patent: Oct. 18, 1994

[54] METHOD FOR MAKING A SOLVENTLESS SILICONE PRESSURE SENSITIVE ADHESIVE COMPOSITION AND PRODUCT

[75] Inventors: Jeffrey H. Wengrovius, Scotia; Timothy B. Burnell, Schenectady; Peter M. Miranda, Glenville, all of N.Y.

[73] Assignee: General Electric Company, Schenectady, N.Y.

[21] Appl. No.: 30,739

[22] Filed: Mar. 12, 1993

[51] Int. Cl.⁵ .......................................... C08F 283/00
[52] U.S. Cl. .................................. 525/478; 525/474; 528/10; 528/39; 528/502
[58] Field of Search ................. 525/478, 474; 528/10, 528/39, 502

[56] References Cited

U.S. PATENT DOCUMENTS 2,676,182  4/1954  Daudt et al. .
3,284,406  11/1966  Nelson .............................. 525/477
4,774,297  9/1988  Murakami et al. .
4,935,484  6/1990  Wolfgruber et al. .

Primary Examiner—Melvyn I. Marquis
Attorney, Agent, or Firm—William A. Teoli; William H. Pittman

[57] ABSTRACT

A method is provided for making a heat curable organopolysiloxane composition, such as a pressure sensitive adhesive composition by blending a benzene soluble resinous copolymer in the form of a spray dried particulate, comprising triorganosiloxy units, such as trimethylsiloxy units, and $SiO_2$ units with a fluid network mixture of an alkenyl siloxane, a silicon hydride siloxane and a hydrosilylation catalyst.

6 Claims, No Drawings

METHOD FOR MAKING A SOLVENTLESS SILICONE PRESSURE SENSITIVE ADHESIVE COMPOSITION AND PRODUCT

REFERENCE TO COPENDING APPLICATIONS

Reference is made to copending application 07/675,380, filed 3-26-91 and copending applications Ser. No. 08/030,737, filed Mar. 12, 1993, and Ser. No. 08/030,740, filed Mar. 12, 1993 filed concurrently herewith.

BACKGROUND OF THE INVENTION

The present invention relates to solventless platinum catalyzed silicone compositions convertible to pressure sensitive adhesives (PSAs) and method for making. More particularly, the present invention relates to the use of a spray dried silicone resin powder having triorganosiloxy units (M) and tetrasiloxy units (Q) and a PSA network mixture of a substantially linear alkenyl siloxane, a substantially linear silicon hydride siloxane and a hydrosilylation catalyst.

As shown by Hahn et al, U S. Pat. No. 3,983,398, platinum catalyzed organopolysiloxane compositions convertible to PSAs comprising a benzene soluble resinous copolymer of triorganosiloxy units and tetrasiloxy units have been used in the form of an organic solvent solution in combination with a network mixture. The network mixture consists of a substantially linear alkenyl siloxane or vinyl siloxane, a substantially linear silicon hydride siloxane and a hydrosilylation catalyst, such as a platinum catalyst.

Although PSAs can be made utilizing a combination of the above-described benzene soluble ingredients, prior to the present invention such PSAs required the stripping of organic solvent from the resinous copolymer while it was in the presence of a silicone fluid, such as a vinyl siloxane fluid. In most instances, the platinum catalyst also was present with the vinyl siloxane fluid during the stripping procedure. Stripping of an organic solvent by a heat curable silicone fabricator who did not have adequate solvent trapping equipment, generated volatiles which often resulted in excessive air pollution. The benzene soluble resinous copolymer was normally available to the fabricator as an organic solvent dispersion, because it could not be readily blended in bulk form into the network mixture. The term "network mixture" hereinafter means one or more of the silicone components comprising the mixture of alkenyl siloxane, a silicon hydride siloxane and a platinum catalyst.

Prior to the present invention, a convenient technique was to blend one or more of the network ingredients, such as the alkenyl siloxane, along with the platinum catalyst into an organic solvent dispersion of the benzene soluble copolymer. When the organic solvent was stripped, a workable silicone blend could be formed which could be formulated with additional heat curable silicone mixture ingredients. The stripping of organic solvent by a fabricator however, is environmentally unattractive particularly if inadequate solvent trapping equipment is used.

In addition to being environmentally hazardous, the use of an organic solvent dispersion of the benzene soluble copolymer with other network ingredients can often interfere with the ability of PSA fabricators to tailor make the PSA to the needs of the customer. It would be desirable therefore to provide readily blendable ingredients for making platinum catalyzed PSAs, potting compositions, vibration damping compositions and flexible casting resins comprising benzene soluble copolymers and network ingredients while at the same time, reduce environmental risks.

As taught in copending application, RD-22,105, organosiloxane hydrolyzate comprising chemically combined triorganosiloxy units and tetrasiloxy units can be spray dried to form a free-flowing silicone resin powder which is dispersible in silicone fluids.

SUMMARY OF THE INVENTION

The present invention is based on the discovery that an organic solvent dispersion of an organosiloxane hydrolyzate comprising triorganosiloxy units, or "M units" of the formula,

$$(R)_3SiO_{0.5}, \quad (1)$$

chemically combined with tetrasiloxy units, or "Q units" of the formula,

$$SiO_2, \quad (2)$$

having an organo to silicon ratio of about 0.5 to 1.5, hereinafter referred to as "the organosiloxane hydrolyzate", "MQ resin", or "M′Q resin", which has been spray dried to produce a finely divided resin particulate having a primary particle size in the range of from about 0.1 to about 200 nanometers and an aggregate particle size of 10 nm to 200 microns, and a low residual volatile content, can be directly dispersed into a PSA network mixture. The term "dispersible" as used hereinafter, means that the spray dried silicone resin powder can form a clear mixture with a silicone fluid which has an indefinite shelf stability. When combined with a silicone network mixture, there can be obtained a customized platinum catalyzed heat curable organopolysiloxane composition without environmental risks.

STATEMENT OF THE INVENTION

There is provided by the present invention, a method for making a substantially solventless heat curable organopolysiloxane composition, comprising blending by weight, 100 parts of a spray dried organosiloxane hydrolyzate comprising chemically combined triorganosiloxane units and tetrasiloxy units having an organo to silicon ratio of about 0.5 to about 1.5, and 50 to 500 parts of a network mixture comprising a substantially linear alkenyl siloxane, a substantially linear silicon hydride siloxane and an amount of a hydrosilylation catalyst which is effective as a network curing catalyst, where the ratio of silicon atoms attached to hydrogen or "SiH", to silicon atoms attached to alkenyl groups or "Si alkenyl" in the network mixture has a value of from about 0.8 to about 2.

Optionally, the substantially solventless heat curable organopolysiloxane composition also can have a crosslinker in the form of an alkenyl siloxane, a silicon hydride siloxane, or an alkenyl silicon hydride siloxane.

Radicals included by R in formula (1) are for example $C_{(1-6)}$ monovalent hydrocarbon radicals and $C_{(1-6)}$ monovalent hydrocarbon radicals substituted with monovalent radicals inert during condensation or addition reactions. There are included within R, monovalent organic radicals such as, $C_{(1-6)}$ alkyl radicals, for example, methyl, ethyl, propyl, butyl; aryl radicals, such as, phenyl, and halogenated phenyl, for example chlorophenyl.

As previously indicated, M'Q resin also can be used to make the PSAs of the present invention. The M'Q resin consists of Q units as defined in formula (2), and M' units which are selected from a mixture of M units of formula (1) and units selected from the group consisting of, $$(R)_2 R^1 SiO_{0.5}, \text{ and} \tag{3}$$

$$(R)_2 H SiO_{0.5}. \tag{4}$$

M' units also can include an average of 0 to 25 mole % of diorganodisiloxy units of the formula, $$R^2 R SiO, \tag{5}$$

and 0 to 25 mole % of monoorganotrisiloxy units of the formula, $$R SiO_{1.5}, \tag{6}$$

based on the total moles of siloxy units in the M'Q resin, where R is as previously defined, $R^1$ is a $C_{(2-4)}$ alkenyl radical, and preferably vinyl, and $R^2$ is selected from the group of R, $R^1$ and H.

The MQ or M'Q resin which are included within the present invention are toluene dispersible, organosiloxane hydrolyzate. These organosiloxane hydrolyzates can contain from about 0.2% to about 5% and preferably from about 1% to about 3% by weight of hydroxy radicals based on the total weight of organosiloxane hydrolyzate. The organosiloxane hydrolyzate can be present in the heat curable compositions of the present invention in an amount ranging from about 20 to about 65, and preferably from about 50 to about 60 parts by weight based on 100 parts by weight of heat curable composition.

A preferred method for making the organosiloxane hydrolyzate involves reacting a silica hydrosol, such as a sodium silicate solution under acidic conditions with a source of triorganosiloxy units such as shown by formula (1) for example a hexaorganodisiloxane, preferably, hexamethyldisiloxane, or a hydrolyzable triorganosilane, for example, trimethylchlorosilane, or mixtures thereof, followed by recovering a benzene dispersible resinous copolymer.

The organosiloxane hydrolyzate is normally available as an organic solvent dispersion having 40 to 60% by weight of solids. Suitable organic solvents which can be used have boiling points below approximately 250° C. which include aromatic hydrocarbons as well as aliphatic hydrocarbons, such as mineral spirits, hexane, heptane and cyclohexane. For ease of handling, as taught in copending application Ser. No. 08/030,737 filed Mar. 12, 1993, the organic solvent dispersion of the organosiloxane hydrolyzate, dan be spray dried to form a finely divided particulate having a primary particle size in the range of from about 0.1–200 nanometers and an aggregate particle size of 10 nm to 200 microns. Spray drying of the organic solvent dispersion of the organosiloxane hydrolyzate can be accomplished with a spray dryer having at least one vortex atomizer nozzle with a rotating atomizer in a dry-gas stream or a two-fluid nozzle. Unlike the method of Wolfgruber et al, U.S. Pat. No. 4,935,484, the organosiloxane hydrolyzate used in the present invention is spray dried as an organic solvent dispersion rather than an aqueous colloidal suspension. Temperatures which can be employed in the dry-gas stream, such as nitrogen, can be from 90° C. to 300° C. and preferably from 100° C. to 250° C. The output temperature of the gas stream formed on drying is from 50° C. to 200° C.

The alkenyl siloxane used in making the network mixture to produce the heat curable organopolysiloxane compositions of the present invention is preferably an alkenyl-terminated polydiorganosiloxane having the formula, $$R^4 R^3_2 SiO(R^3_2 SiO)_m (R^4 R^3 SiO)_n SiR^3_2 R^4, \tag{7}$$

wherein each $R^3$ is independently an alkyl group having from 1 to about 10 carbon atom or an aryl group, $R^4$ is an alkenyl group having from 1 to about 10 carbon atom, "m" is an integer equal to 1 to 300 inclusive, "n" is a whole number equal to 0 to 10, and m+n is equal to 1 to 300.

In formula (7), $R^3$ is an alkyl group selected from methyl, ethyl, and propyl, or an aryl group such as phenyl. Preferably, $R^3$ is methyl. $R^4$ is an alkenyl group such as vinyl, allyl, or propenyl. Preferably, $R^4$ is vinyl.

In formula (7) above, m+n is preferably a number ranging from about 10 to about 100, and most preferably from about 15 to about 25.

The alkenyl siloxane can be prepared by any of the conventional methods for preparing triorganosiloxane terminated polydiorganosiloxanes. For example, a proper ratio of the appropriate hydrolyzable silanes, e.g., vinyldimethylchlorosilane and dimethyldichlorosilane, may be cohydrolyzed and condensed or alternately an appropriate 1,3-divinyltetraorganodisiloxane, e.g., symmetrical divinyldimethyldiphenyldisiloxane or divinyltetramethyldisiloxane, which furnishes the end groups of the polydiorganosiloxane, may be equilibrated with an appropriate diorganopolysiloxane, e.g., octamethylcyclotetrasiloxane, in the presence of an acidic or basic catalyst. Regardless of the method of preparation of the vinyl siloxane, there are usually coproduced, volatile, cyclic polydiorganosiloxanes, such as octamethylcyclotetrasiloxane which are removed by stripping.

The silicon hydride siloxane is an organohydrogenpolysiloxane having the general formula, $$R^5_2 HSiO(R^5 HSiO)_a (R^5_2 SiO)_b SiHR^5_2, \tag{8}$$

wherein each $R^5$ is independently an alkyl group having from 1 to about 10 carbon atom or aryl group, the sum of "a"+"b" being in the range of from 1 to about 300, there being two or greater silicon bonded hydrogen atoms per molecule, no silicon atom bearing more than one silicon bonded hydrogen atom.

In preparing the heat curable composition, the molar ratio of silicon-bonded hydrogen groups in the silicon hydride siloxane to silicon-bonded alkenyl groups in the alkenyl siloxane can be in the range of from about 0.8:1 to about 2.0:1; with the proviso that the total crosslink density of alkenyl siloxane and silicon hydride siloxane is from about 0.2 to about 5.0%, and with the further proviso that the combined viscosities of alkenyl siloxane and silicon hydride siloxane are from about 10 to about 300 centipoise at 25° C.

Examples of alkyl groups represented by $R^5$ in formula (8) above include methyl, ethyl, and propyl. An example of an aryl group represented by $R^5$ is phenyl. Preferably, at least 99.5 percent and most preferably 100 percent of all $R^5$ radicals are alkyl and most preferably methyl.

The total crosslink density or degree of additions between ≡SiH and ≡Sialkenyl groups is from about 0.2 to about 5.0% and preferably from about 0.2 to about 2.0%.

The silicon hydride siloxanes and their preparation are well known in the organosilicon polymer art; some are commercially available. Briefly, the preparation of organohydrogensiloxanes can be accomplished in any suitable manner such as by hydrolyzing silanes, such as chlorosilanes, and equilibrating the resulting hydrolyzate under acid catalysis. Alternately, a mixture of suitable siloxanes, such as cyclic siloxanes and linear siloxanes, can be copolymerized and equilibrated under acid catalysis. For example, a hydride-stopped silicon fluid suitable for use in the present invention can be prepared by reacting tetramethyldisiloxane with cyclic methyl tetramer of predetermined ratio in the presence of Filtrol-20 as catalyst for 4–6 hours at 80–100° C. The Filtrol-20 catalyst is then removed by filtration and the residual reactants are removed by vacuum stripping.

The platinum catalyst of the composition of the present invention is a catalyst which promotes the hydrosilylation reaction. Useful catalysts for facilitating the hydrosilylation curing reaction include precious metal catalysts such as those which use ruthenium, rhodium, palladium, osmium, iridium, and platinum, and complexes of these metals. Examples of suitable hydrosilylation catalysts for use in the present invention are disclosed, for example, in U.S. Pat. Nos. 3,159,601, and 3,159,662 (Ashby); 3,220,970 (Lamoreaux); 3,814,730 (Karstedt); 3,516,946 (Modic), and 4,029,629 (Jeram); all of the foregoing patents being hereby incorporated by reference herein.

Preferably, the hydrosilylation catalyst used in the present invention is a platinum-containing catalyst. Suitable platinum-containing hydrosilylation catalysts include any of the well known forms of platinum that are effective for catalyzing the reaction of silicon-bonded hydrogen atom with silicon-bonded vinyl groups, such as finely divided metallic platinum, platinum on a finely divided carrier such as alumina, compounds of platinum such as chloroplatinic acid and complexes of platinum compounds.

Other suitable platinum-containing hydrosilylation catalysts for use in the present invention include the platinum hydrocarbon complexes described in U.S. Pat. Nos. 3,159,601 and 3,159,662 to Ashby, and the platinum alkanolate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are also useful herein. All of the aforesaid catalysts are thermally activated. Also useful are the photoactive platinum catalysts such as those of U.S. Pat. No. 4,510,094 to Drahnak. All of the U.S. Patents cited in the instant paragraph are incorporated by reference into the present disclosure.

An effective amount of the platinum catalyst is an amount sufficient to provide 5 ppm to 200 ppm of platinum based on the weight of heat curable composition.

The heat curable compositions of the present invention can be prepared by simply mixing the spray dried organosiloxane hydrolyzate and the alkenyl siloxane, the silicon hydride siloxane, optionally the crosslinker and the hydrosilylation catalyst in the stated proportions. The order of mixing of the various components is not critical, except that silicon hydride siloxane and/or the hydride crosslinker and the hydrosilylation catalyst are preferably brought together last. It is preferred to add the silicon hydride siloxane and the hydride crosslinker after all of the heating operations in the preparation process have been completed. Preferably, the mixture of the spray dried organosiloxane hydrolyzate and the alkenyl and the catalysts is formulated followed by the addition of the silicon hydride siloxane and optionally the crosslinker.

The heat curable organopolysiloxane compositions of the present invention can be utilized as pressure sensitive adhesives (PSAs), potting compositions, vibration damping compositions and flexible casting resins.

Small amounts of additional ingredients may be added to the composition of the invention if desired. For example, antioxidants, pigments, stabilizers, fillers, and the like, may be added as long as they do not materially reduce the pressure sensitive adhesive properties of these compositions. Volatile additives are preferably added after any solvent removal operations have been completed.

A long or longer "shelf life" can be obtained by mixing a platinum catalyst inhibitor in either of the two components of a two-component system or in the curable mixture in the case of a one component system. Platinum catalyst inhibitors which are useful in the composition of this invention and which display varying lengths of cure time inhibition in our compositions are those described in U.S. Pat. Nos. 3,188,299; 3,188,300, 3,192,181; 3,344,111; 3,383,356; 3,445,420; 3,453,233, 3,453,234; and 3,532,649, and others which might be known in the art. All of the patents cited in the instant paragraph are incorporated by reference herein. Concrete examples of inhibitors which can be used in the composition of the present invention include the ynes, such as 3-methyl-3-pentene-1-yne and 3,5-dimethyl-3-hexene-1-yne; and the alkenyl alcohols, such as 3-methyl-1-butyne-3-ol; 3,5-dimethyl-1-hexyne-3-ol; 3-methyl-1-pentyne-3-ol; and phenylbutynol; the unsaturated esters, such as alkyl and substituted alkyl maleares; and polymethylvinylcyclosiloxanes.

The effectiveness of a platinum catalyst inhibitor depends on many factors such as its chemical composition, its physical properties, its concentration, and the like. For the purposes of this invention, an effective amount of any particular platinum catalyst inhibitor can be determined by routine experimentation. Since many platinum catalyst inhibitors are relatively volatile it is preferably to add them to the compositions of this invention after any heating and/or vacuum operations of the preparative process have been completed.

In the event the heat curable compositions of the present invention are employed as PSAs, the PSA can be applied to the surface of a substrate, which can be flexible or rigid, by adding suitable coating means such rolling, spreading, spraying and the like.

The surface of the support and the substrate to which the support is adhered may be any known solid material such as metals, e.g., aluminum, silver, copper, iron, and their alloys; porous materials such as paper, wood, leather, and fabrics; polymeric materials such as polyolefins, e.g., polyethylene, polypropylene and polystyrene; polytetrafluoroethylene and polyvinylfluoride; silicone elastomers, silicone resins, polyamides, polyimides, polyesters, and acrylic polymers; painted surfaces; siliceous materials, such as concrete, bricks, cinderblocks, and glass, e.g. glass cloth and the like. Porous materials such as glass cloth are often impregnated with a substance that will prevent the migration of the PSA from one surface to another surface of the support. It is also well known to chemically treat the surface of a fluorocarbon polymer support to enhance the adhesion of a PSA to said surface. A primer also can be used to treat the surface of the substrate to enhance PSA adhesion.

Solid supports bearing the cured compositions of this invention are reliably adhered to any solid substrate because the compositions possess the desirable combination of high tack and good adhesive strength.

Useful articles which can be prepared with the PSAs of this invention include pressure sensitive adhesive tapes, labels, emblems, and other decorative or informative signs, and the like. An especially useful article is one comprising a support, flexible or rigid, that can withstand extreme temperatures, hot and/or cold, and carrying on at least one surface thereof, the polyorganosiloxane PSAS of this invention. Such an article makes full use of the stability at high temperatures and the flexibility at low temperatures that the PSAs of this invention possess.

A preferred article is a pressure sensitive adhesive tape comprising an impregnated glass cloth, a polyester poisoner, a polyimide polymer, or a chemically treated fluorocarbon polymer support carrying on at least one surface thereof the cured compositions of this invention.

In order that those skilled in the art may better understand the present invention, the following examples are given to illustrate but not to limit the invention which is fully delineated by the appended claims.

EXAMPLE 1

Spray dried organosiloxane hydrolyzate having an M/Q ratio of 0.6 was prepared by the following procedure:

91 parts of a sodium silicate solution (225 g, 27% $SiO_2$) were mixed thoroughly with 130 parts of water (321 g). This mixture was added with stirring to 81 parts of 16.5% of HCl in cooled water over a period of 7 min. Shortly after the completion of this addition (within 45 sec.), 87 parts of isopropanol (214.8 g) were added over a period of 5 min. After waiting for a period of 1 min., a mixture of 31.0 parts $Me_3SiCl$ (76.45 g) and 3.4 parts toluene (8.49 g) were next added over a period of 20 min. The reaction mixture was allowed to warm to room temperature and was then heated to reflux for 1.5 hr. 40.5 parts of toluene (100 g) were added with stirring. The reaction mixture was then transferred to an addition funnel in which organic and aqueous layers separated. The aqueous layer was removed, and the organic layer was washed with 300 g water. The water-/isopropanol/toluene azeotrope was distilled from this solution yielding a solution of an MQ resin in toluene (35% by weight) having an M/Q ratio of about 0.6.

The MQ resin dispersion was then spray dried using a Yamato model GS31 organic solvent spray-dry apparatus. Spray-drying was achieved by atomizing the MQ resin/toluene dispersion in a nitrogen stream heated to 100° C. The outlet temperature was 71° C. An MQ resin powder was obtained having a volatile content of less than or equal to 2%. This residual solvent was then removed using a vacuum over. Particle size analysis using TEM (transmission electron microscopy) showed an average primary particle size of about 20 nanometers.

A series of silicone PSAs were prepared by blending the above MQ resin powder with a curable network silicone fluid mixture consisting of a vinylsiloxane having an average of 24.4 condensed dimethylsiloxy units and terminated with dimethylvinylsiloxy units, a silicon hydride siloxane having an average of 24.2 dimethylsiloxy units, 3.44 methylhydrogensiloxy units and terminated with trimethylsiloxy units, and a crosslinker having an average of 20.8 dimethylsiloxy units and terminal dimethylhydrogensiloxy units, 25 ppm of a platinum catalyst shown by Karstedt in U.S. Pat. No. 3,814,730 and 0.75% by weight of dimethyl maleate as an inhibitor. In the PSA composition series, the MQ resin powder was employed at a range of from about 5% by weight to 62% by weight based on the total weight of the PSA compositions. The silicon hydride siloxane was employed with the vinyl siloxane at molar ratios of from about 1 to about 1.2. The PSAS were applied to a thickness of about 1 mil onto a Mylar ® polyester film having a thickness of about 1.5 to 2 mils. PSAs were then cured at 130° C. for 8 minutes and tested for a peel adhesion (ounce/inch) using an Instron tester. The PSAs were also measured for tack employing a probe tack tester. The following adhesion results were obtained, where SiH/SiVi values are the molar ratios of silicon hydride siloxy units in the silicon hydride siloxane and silicon hydride containing crosslinker to the vinyl siloxy units in the vinyl siloxane:

| WT % MQ resin | SiH/SiVi = 1 | SiH/SiVi = 1.1 | SiH/SiVi = 1.2 |
| --- | --- | --- | --- |
| 54 | 15 | — | — |
| 56 | 18 | — | — |
| 58 | 22 | 26 | 23 |
| 60 | 31 | 32 | 30 |
| 62 | 34 | 40 | 37 |

Tack values were found to be greater than 700 grams/centimeter$^2$ for all PSAs having greater than 56% by weight of MQ powder in the PSA composition.

EXAMPLE 2

The procedure of Example 1 was repeated except that the total of MQ resin powder in the total PSA composition was maintained at 6% by weight. The balance of the curable network mixture again consisted of the silicon hydride siloxane fluid and the vinyl siloxane fluid were utilized in a molar ratio of SiH/SiVi of 1, 1.1 and 1.2. In addition, a silicon hydride crosslinker was employed having an average of 24.2 condensed dimethylsiloxy units, 3.44 methylhydrogensiloxy units and terminated with trimethylsiloxy units. The crosslinker was employed in combination with the silicon hydride siloxane to provide a network mixture having both terminal and internal silicon hydride siloxy units in the range of from 60/40 to 100/0 mole percent. Peel adhesion (ounce/inch) and tack values were measured as in Example 1 and the following results were obtained:

| Moles of Terminated SiH/ Internal SiH | SiH/SiVi = 1 | SiH/SiVi = 1.1 | SiH/SiVi = 1.2 |
| --- | --- | --- | --- |
| 60/40 | 22 | 25 | 31 |
| 70/30 | 25 | 28 | 30 |
| 80/20 | 31 | 32 | 30 |
| 90/10 | 32 | 32 | 30 |
| 95/5 | 33 | 34 | 30 |

-continued

| Moles of Terminated SiH/ Internal SiH | SiH/SiVi = 1 | SiH/SiVi = 1.1 | SiH/SiVi = 1.2 |
|---|---|---|---|
| 100/0 | Cohesive Failure | | |

Tack values were >700 g/cm² for all PSAs.

Although the above examples are directed to only a few of the very many variables which can be employed in the practice of the method of the present invention, the method of the present invention is directed to the use of a much broader variety of organosiloxane hydrolyzate, vinyl siloxanes, silicon hydride siloxanes, crosslinkers and platinum catalysts as set forth in the description preceding these examples.

What we claim as new and desire to secure by Letters Patent of the United States is:

1. A method for making a heat curable silicone PSA which reduces environmental risks comprising mixing together,
   (a) a free-flowing silicone resin powder having a primary particle size range of from about 0.1 to about 200 nanometers which has been formed by spray drying in a dry-gas stream at a temperature in the range of from 90° C. to 300° C., an organic solvent dispersion of an organo siloxane hydrolyzate comprising triorganosiloxane units and $SiO_2$ units and having an organo to silicon ratio of about 0.5 to about 1.5,
   (b) a substantially linear alkenyl siloxane,
   (c) a substantially linear silicon hydride siloxane, and,
   (d) an amount of a hydrosilylation catalyst which is effective for curing the heat curable silicone PSA, where the heat curable silicone PSA has a ratio of hydrogen atoms attached to silicon and alkenyl groups attached to silicon having a value of from 0.8 to about 2 and there is utilized from 50 to 500 parts by weight of (b), (c) and (d), per 100 parts of (a).

2. A method in accordance with claim 1, where the hydride siloxane is a polydimethylsiloxane fluid consisting essentially of condensed dimethylsiloxy units and having terminal dimethylhydrogensiloxy units.

3. A method in accordance with claim 1, where the hydrosilylation catalyst is a platinum catalyst.

4. A method in accordance with claim 3, where the platinum catalyst is blended with a platinum catalyst inhibitor.

5. A method in accordance with claim 1, where the heat curable silicone PSA contains a silicone crosslinker having internal or terminal SiH or Si alkenyl groups.

6. A method in accordance with claim 1 where the free-flowing silicone resin powder is blended with a preformed mixture of (b), (c) and (d).

* * * * *